(12) United States Patent
Morzano

(10) Patent No.: US 7,099,989 B2
(45) Date of Patent: *Aug. 29, 2006

(54) SYSTEM AND TECHNIQUE TO REDUCE CYCLE TIME BY PERFORMING COLUMN REDUNDANCY CHECKS DURING A DELAY TO ACCOMMODATE VARIATIONS IN TIMING OF A DATA STROBE SIGNAL

(75) Inventor: Christopher K. Morzano, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 120 days.

This patent is subject to a terminal disclaimer.

(21) Appl. No.: 10/651,324

(22) Filed: Aug. 28, 2003

(65) Prior Publication Data

US 2004/0037135 A1 Feb. 26, 2004

Related U.S. Application Data

(63) Continuation of application No. 09/510,138, filed on Feb. 22, 2000, now Pat. No. 6,615,331.

(51) Int. Cl.
*G06F 12/00* (2006.01)

(52) U.S. Cl. .................... 711/5; 711/102; 711/103; 711/104; 711/105; 711/167; 365/233; 365/233.5; 345/534; 345/535; 713/502

(58) Field of Classification Search ................ 711/5, 711/167; 365/200, 233; 713/502; 345/534
See application file for complete search history.

(56) References Cited

U.S. PATENT DOCUMENTS

| 5,761,139 | A | * | 6/1998 | Shibata et al. | ............... | 365/200 |
| 5,805,873 | A | * | 9/1998 | Roy | ............................ | 713/502 |
| 5,889,727 | A | * | 3/1999 | Hsu et al. | .................... | 365/233 |
| 6,125,421 | A | * | 9/2000 | Roy | ............................... | 711/5 |
| 6,615,331 | B1 | * | 9/2003 | Morzano | ..................... | 711/167 |

\* cited by examiner

*Primary Examiner*—Mano Padmanabhan
*Assistant Examiner*—Mardochee Chery
(74) *Attorney, Agent, or Firm*—Trop, Pruner & Hu, P.C.

(57) ABSTRACT

A memory device includes a memory cell array, an addressing circuit, a data communication circuit and a control circuit. The addressing circuit receives first signals that are indicative of an address associated with a write command, decodes the address to provide column select signals that are indicative of a column address in the memory cell array, and uses the column address to perform a column redundancy check. The data communication circuit latches data signals that are associated with the write command in response to a data strobe signal. The control circuit causes the addressing circuit to perform the column redundancy check during a delay to accommodate variations in the timing of the data strobe signal and begins providing the column select signals to the memory cell array after performing the column redundancy check. The memory device may be a double data rate (DDR) synchronous dynamic random access memory (SDRAM), for example.

35 Claims, 5 Drawing Sheets

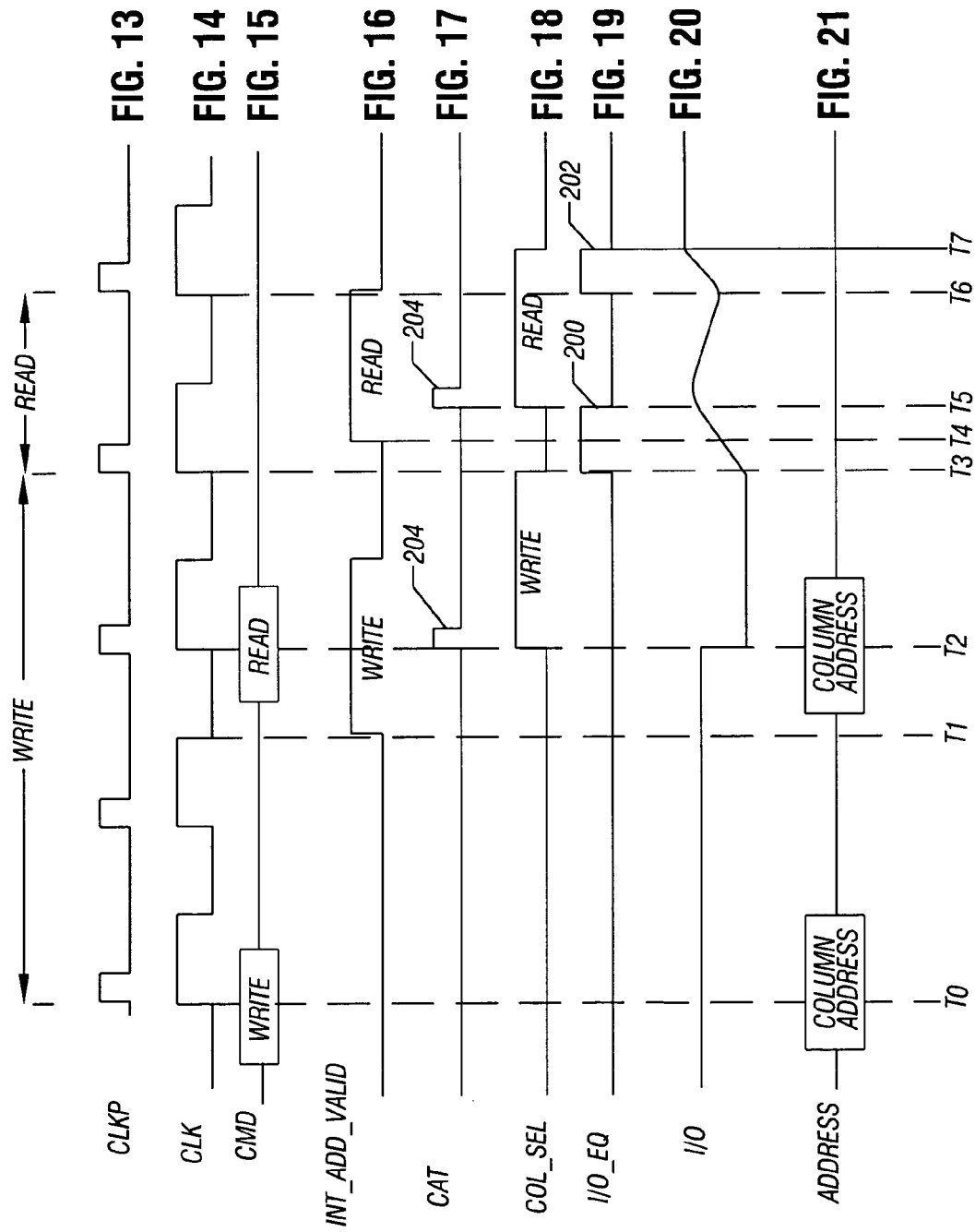

SYSTEM AND TECHNIQUE TO REDUCE CYCLE TIME BY PERFORMING COLUMN REDUNDANCY CHECKS DURING A DELAY TO ACCOMMODATE VARIATIONS IN TIMING OF A DATA STROBE SIGNAL

This is a continuation of prior application Ser. No. 09/510,138, filed Feb. 22, 2000 now U.S. Pat. No. 6,615,331.

BACKGROUND

The invention relates to reducing cycle time in a memory device, such as a double data rate (DDR) synchronous dynamic random access memory (SDRAM) device, for example.

A computer system typically includes semiconductor memory devices to store data structures and program code, and it is often desirable to improve the speed at which a central processing unit (CPU) of the system accesses these memory devices. Typically, the memory devices set the rate at which the CPU may communicate with the devices.

For example, in a synchronous dynamic random access memory (SDRAM), the signals that are depicted in FIGS. 1, 2, 3 and 4 may occur in association with a write operation, and as described below, the SDRAM may introduce delays in the processing of the write operation. For example, in association with the write operation, the SDRAM receives signals (from a memory bus) that indicate a memory address. The SDRAM decodes these signals to produce column select signals (indicated by reference numeral 9 in FIG. 2) that indicate the columns of the targeted memory cells. When the address signals are decoded, circuitry of the SDRAM asserts an internal address valid strobe signal called INT_ADD_VALID (see FIG. 4). As depicted in FIG. 4, the INT_ADD_VALID signal may be asserted near time $T_0$ to indicate the availability of the decoded address.

Before the internal write operation to the targeted memory cells begins, the SDRAM performs redundancy checks to determine if one or more redundant columns of memory cells should be used. The time to perform these redundancy checks typically introduces a latency to the write operation (as depicted by reference numeral 10 in FIG. 3), a latency that delays the internal write operation from beginning on the positive edge of a CLK signal (see FIG. 1) at time $T_0$ to beginning after the positive edge at time $T_1$. In this manner, at time $T_1$, circuitry of the SDRAM may pulse high (as indicated by a pulse 8 in FIG. 3) a column address latch, or trap, signal (called CAT) to latch the column select signals to begin an internal write operation to store data in the memory cells.

Another type of memory device is a double data rate (DDR) SDRAM. Exemplary memory bus signals that typically are associated with writing data to the DDR SDRAM are depicted in FIGS. 5, 6, 7, 8, 9, 10 and 11. More particularly, the DDR SDRAM captures data from the memory bus using the positive and negative edges of a data strobe signal (called DQS) that is furnished to the memory bus by a memory controller. In this manner, in association with a write operation, the memory controller furnishes data signals to the memory bus (to which the DDR SDRAM is coupled) and drives a DQS strobe line with the DQS signal to trigger the capture of data by the DDR SDRAM.

Because the data and data strobe signals propagate across the memory bus from the memory controller to the DDR SDRAM, the DDR SDRAM must be capable of accommodating a wide range of possible propagation delays for these signals. For example, the minimum time at which the DQS signal may arrive at the DDR SDRAM is depicted by the $DQS_{MIN}$ signal of FIG. 9 and is shown in relationship to its associated data signals (represented by $DATA_{MIN}$ in FIG. 8). Likewise, the maximum time at which the DQS signal may arrive at the DDR SDRAM is depicted by the $DQS_{MAX}$ signal of FIG. 11, and the corresponding $DATA_{MAX}$ data signals are depicted in FIG. 10. To accommodate the worst case scenario (i.e., the maximum delay time), the DDR SDRAM typically does not assume its captured data is valid until time $T_4$. Thus, accommodating this worst case scenario may introduce a latency to the write operation. Furthermore, the performance of a column redundancy check by the DDR SDRAM may introduce an additional latency time into the processing of the write operation.

Thus, there is a continuing need for a memory device that addresses one or more of the problems stated above.

SUMMARY

In one embodiment of the invention, a method usable with a memory device includes receiving a data strobe signal from a memory bus and capturing data that is associated with a write command from the memory bus in synchronization with the data strobe signal. A column redundancy check is performed in response to an address that is associated with the write command, and the beginning of an internal write operation to a memory cell array of the memory device is synchronized to a clock signal.

Advantages and other features of the invention will become apparent from the following description, the drawing and from the claims.

BRIEF DESCRIPTION OF THE DRAWING

FIGS. 13, 14, 15, 16, 17, 18, 19, 20 and 21 are timing diagrams of various signals of the DDR SDRAM of FIG. 12 illustrating a write operation followed by a read operation.

DETAILED DESCRIPTION

Figure 1:
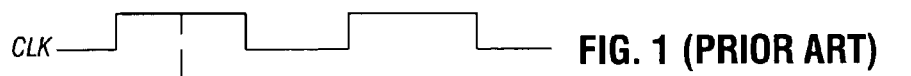
FIGS. 1, 2, 3 and 4 are timing diagrams of signals of a synchronous dynamic random access memory (SDRAM) of the prior art.
Figure 2:
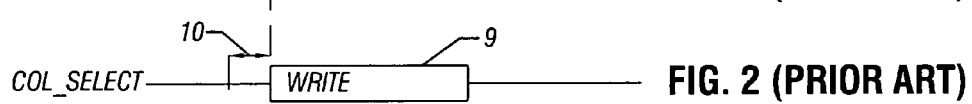
Figure 3:
Figure 4:
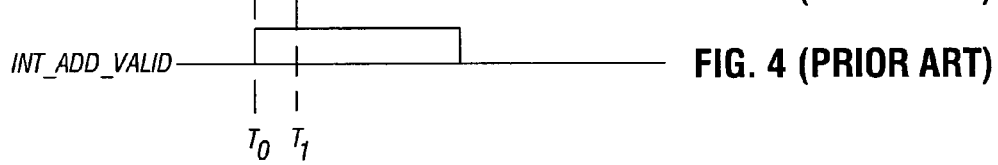
Figure 5:
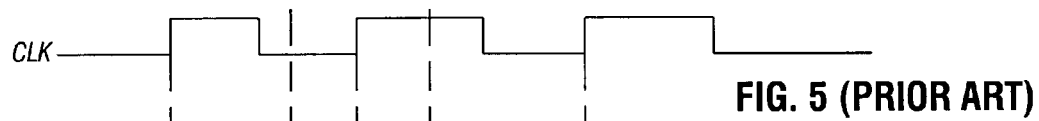
FIGS. 5, 6, 7, 8, 9, 10 and 11 are timing diagrams of signals of a double data rate (DDR) synchronous dynamic random access memory (SDRAM) of the prior art.
Figure 6:
Figure 7:
Figure 8:
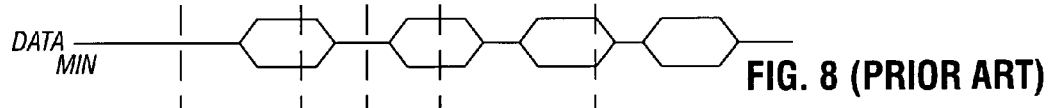
Figure 9:
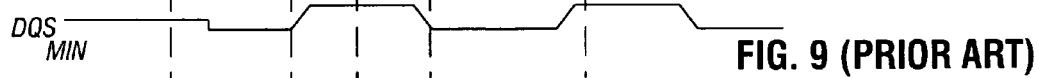
Figure 10:
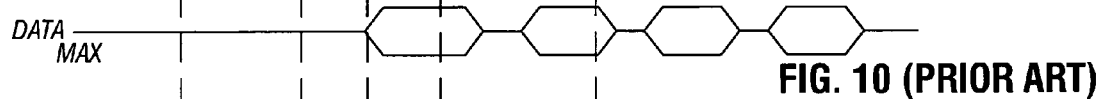
Figure 11:
Figure 12:
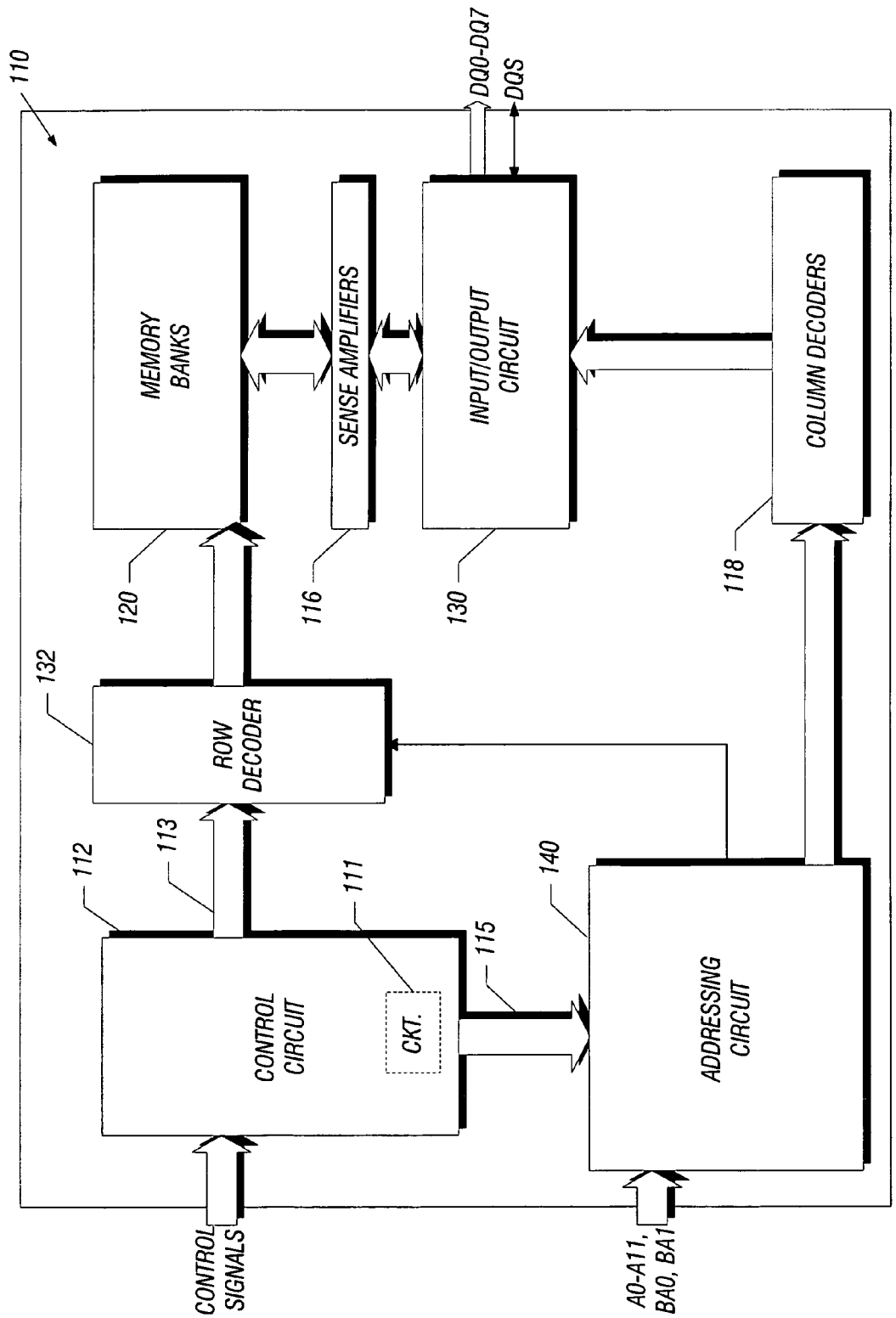
FIG. 12 is a block diagram of a DDR SDRAM according to an embodiment of the invention.

Referring to FIG. 12, an embodiment 110 of a double data rate (DDR) synchronous dynamic random access memory (SDRAM) in accordance with the invention includes a control circuit 112 that is constructed with features to minimize latencies associated with write and read operations. In particular, during a write operation, the DDR SDRAM 110 establishes a window of time to capture data to accommodate variations in the timing of a data strobe signal and its associated data signals. However, during this window of time, the DDR SDRAM 110 performs column redundancy checks. Therefore, when the window of time elapses, the DDR SDRAM 110 may immediately initiate an internal write operation to store the captured data in an internal array of memory cells without introducing an additional latency time to perform the column redundancy checks.

For example, in some embodiments, for a write operation, the control circuit 112 is adapted to perform column redundancy checks before an addressing circuit 140 (of the DDR SDRAM 110) provides column select signals to an internal memory cell array, an event that begins the internal write operation to the memory cells of the DDR SDRAM 110. Because the addressing circuit 140 provides the column select signals in response to a pulse in a column address latch, or trap, signal (called CAT (see FIG. 17)) that is provided by the control circuit 112, the control circuit 112 may synchronize the pulsing of the CAT signal with the end of the window that is used to ensure valid data. As a result of the above-described arrangement, the DDR SDRAM 110 does not consume additional time performing column redundancy checks. Therefore, a significant savings (over 15%, for example) in the overall write latency time may be achieved.

More particularly, referring also to FIGS. 13, 14, 15, 16, 17, 18, 19, 20 and 21, the DDR SDRAM 110 may receive control controls that are synchronized to a clock signal (called CLK). In this manner, the control circuit 112 may latch control signals that indicate a write command on a positive edge of the CLK signal (at time $T_0$), as depicted in FIG. 15. Also at time $T_0$, the addressing circuit 140 latches address signals that indicate a column address, as depicted in FIG. 21. The addressing circuit 140 decodes the column address and is ready to assert the column select signals at time $T_1$, as indicated by the assertion of an internal address valid signal called INT_ADD_VALID (see FIG. 16). However, the window of time that is used to ensure valid data capture extends until time $T_2$, a time at which the captured data is available to be written to the memory cells.

For purposes of reducing latency in the write operation, the addressing circuit 140 performs a redundancy check beginning on a negative edge of the CLK signal at time $T_1$, the time at which the decoded internal address becomes valid. Therefore, at time $T_2$, the addressing circuit 114 may begin the internal write operation to the targeted memory cells in synchronization with the CLK signal, i.e., the internal write operation may begin synchronously with the positive edge of the CLK signal because the column redundancy checks have already been performed.

A read operation that follows the above-described write operation is also depicted in the figures, as the combination of a write operation followed by a read operation may be a worst case scenario in terms of latencies. In particular, to initiate the read operation, the control circuit 112 latches control signals that indicate a read command on a positive edge of the CLK signal (at time $T_2$), as depicted in FIG. 15. Also at time $T_2$, the addressing circuit 140 latches address signals that indicate a column address for the read operation, as depicted in FIG. 21. The addressing circuit 140 then decodes the column address to derive an internal column address for the read operation and is ready to assert column select signals at time $T_4$, as depicted in FIG. 16 by the assertion of the INT_ADD_VALID signal. The addressing circuit 140 then proceeds to perform column redundancy checks from times $T_4$ to $T_5$. Thereafter, at time $T_5$, the addressing circuit 140 asynchronously initiates the internal read operation by asserting the appropriate column select signals.

Because the column redundancy checks for the read operation introduce a delay (from times $T_4$ to $T_5$) into the read operation, the delayed start to the read operation may be used for purposes of equalizing bit lines after the write operation. In this manner, the write operation may cause input/output (I/O) bit lines to be driven to one of two voltage levels (i.e., one voltage level to indicate a "0" bit and the other voltage level to indicate a "1" bit). For example, a particular bit line may be driven to low voltage level (for example) from time $T_2$ to time $T_3$, as depicted by a signal called I/O in FIG. 20. At time $T_3$, the control circuit 112 asserts a signal (called I/O_EQ and depicted in FIG. 19) to equalize the bit lines. Because the write operation begins at time $T_2$ (and is not shifted forward in time), the internal write operation ends at time T3, a time at which equalization of the bit lines begins. Thus, as depicted in FIG. 19, the I/O_EQ signal may be pulsed high for an equalization pulse 200 that occurs after a write operation. The equalization pulse 200 may last until the initiation of the read operation at time $T_4$. Therefore, the addressing circuit 114 may assert the equalization pulse 200 for a sufficient time to equalize the bit lines while allowing the write operation to last for an entire clock cycle and without delaying the read operation.

A pulse 202 that has a shorter duration than the pulse 200 may be used to equalize the bit lines after the read operation. A shorter duration pulse is used because, unlike a write operation, a read operation does not drive the bit lines to the appropriate voltage levels. Therefore, a shorter time is needed to equalize the bit lines after the read operation.

For purposes of providing the column select signals to begin an operation, in some embodiments, the control circuit 112 includes a circuit 111 (see FIG. 12) that generates a column address latch, or trap, signal (called CAT and depicted in FIG. 17). In this manner, the circuit 111 momentarily pulses the CAT signal to cause the addressing circuit 140 to latch its internally generated column select signals and provide the latched signals to column decoders 118 (see FIG. 12) to begin either an internal write or an internal read operation. In this manner, a latching pulse 204 in the CAT signal begins at time $T_2$ to cause the addressing circuit 140 to initiate the internal write operation, and a latching pulse 206 in the CAT signal begins at time $T_5$ to cause the addressing circuit 140 to latch the column select signals and begin the internal read operation. In some embodiments, the duration of the pulse 200 (see FIG. 19) of the I/O_EQ signal is approximately twice the duration of one of the latching pulses 204 and 206 of the CAT signal, and the duration of the pulse 202 of the I/O_EQ signal is approximately the same as the duration of one of the latching pulses 204 and 206 of the CAT signal.

Figure 22:
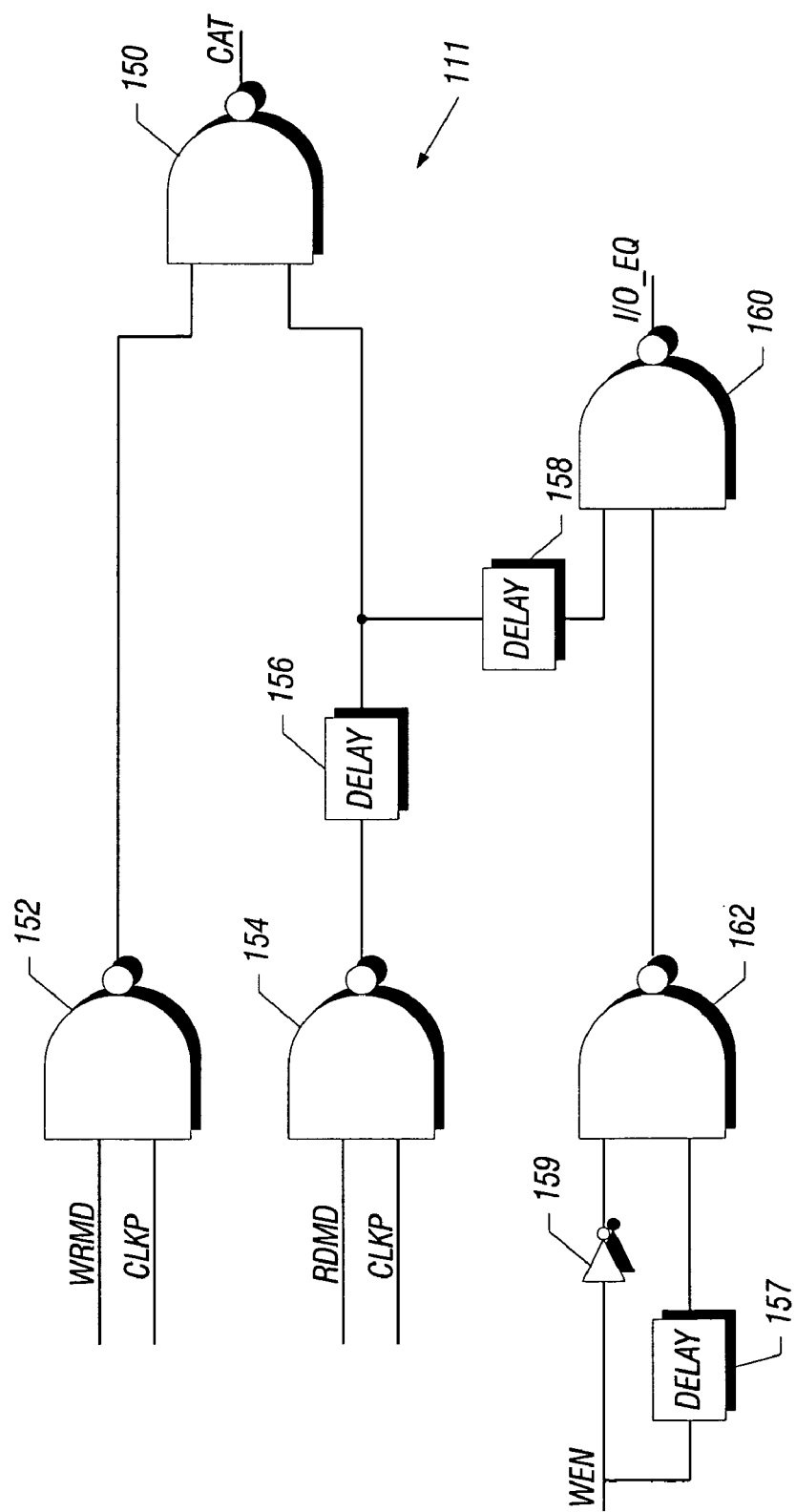
FIG. 22 is a schematic diagram of circuitry of the control circuit of the DDR SDRAM of FIG. 12 according to an embodiment of the invention.

Referring to FIG. 22, in some embodiments, the circuit 111 may include the following logic to generate the CAT and I/O_EQ signals. For purposes of generating the latching pulse 204 for write operations, the circuit 111 includes a NAND gate 152 that receives a signal (called WRMD) that indicates a write mode (when asserted) and receives a signal (called CLKP) that is momentarily pulsed high in synchronization with each positive edge of the CLK signal, as depicted in FIG. 13. The output terminal of the NAND gate 152 is coupled to an input terminal of an NAND gate 150 that furnishes the CAT signal at its output terminal. Thus, when the WRMD signal is asserted (to indicate the write mode), the CAT signal is momentarily asserted in synchronization with a positive edge of the CLK signal to form the latching pulse 204.

For purposes of generating the latching pulse 206 for read operations, the circuit 111 includes a NAND gate 154 that receives a signal (called RDMD) that indicates a read mode (when asserted) and receives the CLKP signal. The output terminal of the NAND gate 154 is coupled to an input terminal of a delay element 156 (one or more inverters or buffers, for example). An output terminal of the delay element 156, in turn, is coupled to another input terminal of the NAND gate 150. Thus, when the RDMD signal is asserted (to indicate the read mode), the CAT signal is momentarily asserted to form the pulse 206 after a delay that is formed by the delay element 156.

For purposes of generating the pulse 202 in the I/O_EQ signal for a read operation, the delay element 158 is coupled between the output terminal of the delay element 156 and an input terminal of a NAND gate 160. The output terminal of the NAND gate 160 furnishes the I/O_EQ signal. Therefore, when the RDMD signal is asserted, the I/O_EQ signal is momentarily asserted to form the pulse 202 after a delay is introduced by the delay elements 156 and 158.

For purposes of generating the pulse 200 in the I/O_EQ signal for a write operation, an input terminal of an inverter 159 receives a write enable signal (called WEN) that generally follows the INT_ADD_VALID signal for a write operation. The output terminal of the inverter 159 is coupled to an input terminal of an NAND gate 162, and the output terminal of the NAND gate 162 is coupled to another input terminal of the NAND gate 160. A delay element 157 includes an input terminal that receives the WEN signal, and an output terminal of the delay element 157 is coupled to another input terminal of the NAND gate 162. Thus, when the WEN signal is deasserted (to indicate the end of the internal write operation), the I/O_EQ signal is momentarily asserted (for the duration that is introduced by the delay element 157) to form the pulse 200. In some embodiments, the delay elements 156 and 157 may introduce approximately the same delay.

Referring back to FIG. 12, among the other features of the DDR SDRAM 110, the DDR SDRAM 110 may include memory banks 120 that form the array of memory cells that are read from or written to, as described above. Row decoders 132 receive row select signals from the addressing circuit 140, and based on these signals, the row decoders 132 select the appropriate memory banks and rows. Column decoders 118 receive the column select signals from the addressing circuit 140. The column decoders 118 are coupled to an input/output (I/O) circuit 130 that communicates data signals with data lines of the memory bus. Sense amplifiers 116 are coupled between the input/output circuit 130 and the memory banks 120 to aid in the storage and retrieval of data to/from the memory banks 120.

Figure 23:
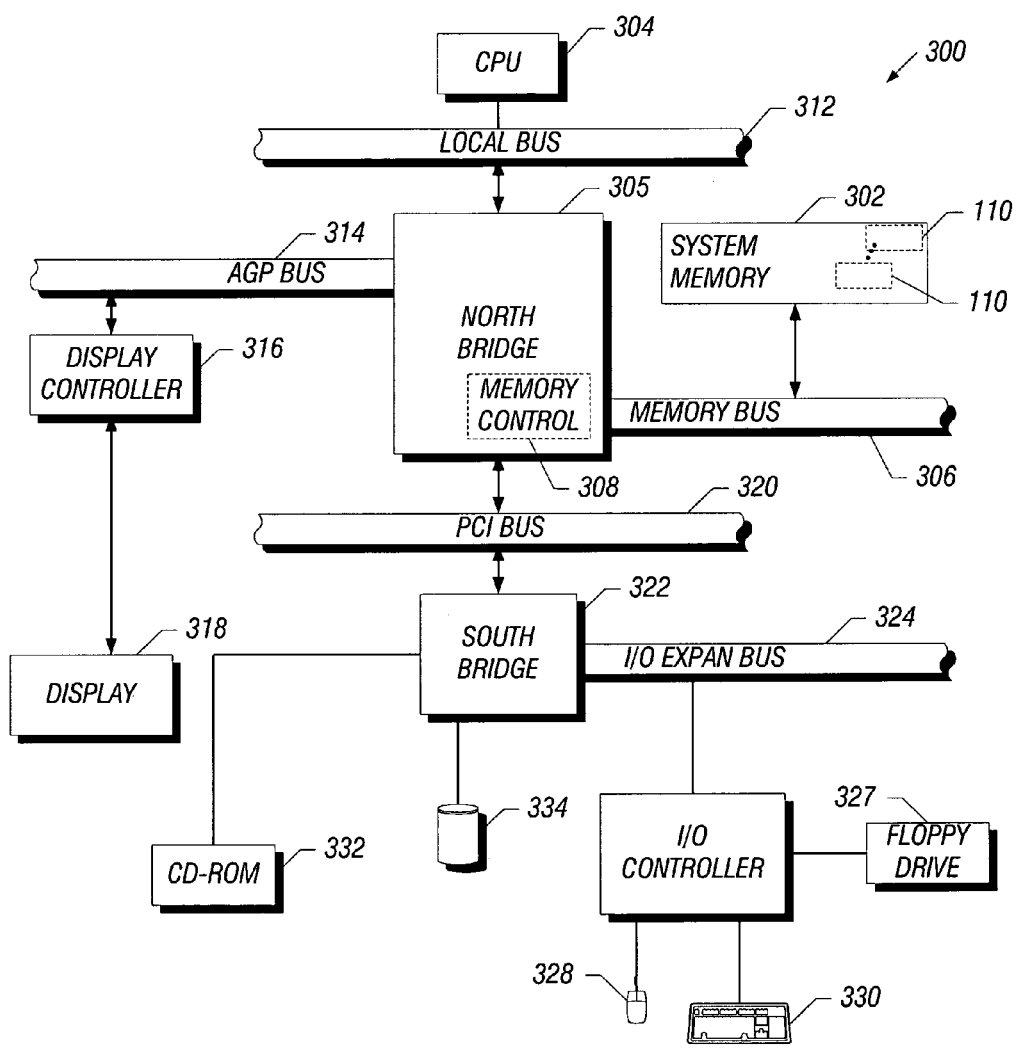
FIG. 23 is a schematic diagram of a computer system according to an embodiment of the invention.

Referring to FIG. 23, in some embodiments, several DDR SDRAMs 110 may form a system memory 302 of a computer system 300. In this manner, the computer system 300 may include a central processing unit (CPU) 304 that is coupled to a local bus 312 and is interfaced to a memory bus 306 via a north bridge 305. The system memory 302 is coupled to the memory bus 306. A memory controller 308 of the north bridge 305 may provide signals (to the memory bus 306) that cause the system memory 302 to perform read and write operations.

Among the other features of the computer system 300, in some embodiments, the north bridge 305 may provide an interface to an Accelerated Graphics Port (AGP) bus 314 and provide an interface to a Peripheral Component Interconnect (PCI) bus 320. The AGP standard is described in the Accelerated Graphics Port Interface Specification, Revision 1.0, published on Jul. 31, 1996, by Intel Corporation of Santa Clara, Calif., and the PCI Specification is available from The PCI Special Interest Group, Portland, Oreg. 97214. A display controller 316 may be coupled to the AGP bus 314 and furnish signals to control a display 318. A south bridge 322 may be coupled to the PCI bus 320 and provide an interface to an input/output (I/O) expansion bus 324 that may be coupled to an I/O controller 326, for example. The I/O controller 326 may control operations of a floppy disk drive 327 and receive input signals from a mouse 328 and a keyboard 330, as examples. The south bridge 322 may also control operations of a hard disk drive 334 and a CD-ROM drive 332, as examples.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method usable with a memory device, comprising:
performing a column redundancy check; and
synchronizing the beginning of an internal write operation to a memory cell array of the memory device to a clock signal.

2. The method of claim 1, wherein the internal write operation begins on an edge of the clock signal.

3. The method of claim 1, further comprising:
providing column select signals to the memory cell array in synchronization with the clock signal.

4. The method of claim 3, wherein the providing of the column select signals comprises:
latching the column select signals synchronously with an edge of the clock signal.

5. The method of claim 3, wherein the latching of the column select signals comprises asserting a column address trap signal synchronously with the edge of the clock signal.

6. The method of claim 1, wherein the column redundancy check is performed beginning on a first edge of the clock signal and the providing of the column select signals begins on another edge of the clock signal.

7. A method usable with a memory device, comprising:
providing column select signals indicative of a column address to a memory cell array of the memory device; and
performing a column redundancy check prior to the initiation of the providing of the column select signals.

8. The method of claim 7, wherein the providing of the column select signals comprises latching the column select signals synchronously with an edge of a clock signal.

9. The method of claim 8, further comprising:
latching data associated with a write command in response to a data strobe signal, wherein the latching of the column select signals comprises asserting a column address trap signal synchronously with the edge of the clock signal.

10. The method of claim 7, wherein the performing of the column redundancy check begins on a first edge of a clock signal and the providing of the column select signals begins on another edge of the clock signal.

11. The method of claim 10, wherein said another edge comprises the next successive edge of the clock signal after the first edge.

12. The method of claim 7, further comprising:
asserting another signal to equalize a data I/O line of the memory device for a first time interval that begins after the providing of the column select signals.

13. The method of claim 12, further comprising:
deasserting said another signal to terminate the first time interval; and
beginning an internal read operation after the deassertion of said another signal.

14. The method of claim 13, further comprising:
asserting said another signal after the beginning of an internal read operation for a second time interval less than the first time interval.

15. The method of claim 7, wherein the memory device comprises a double data rate (DDR) synchronous dynamic random access memory (SDRAM).

16. A memory device comprising:
a memory cell array;
a first circuit to perform a column redundancy check in response to a decoded address; and
a second circuit to synchronize an initiation of an internal write operation to the memory cell array with a clock signal.

17. The memory device of claim 16, wherein the second circuit synchronizes the initiation of an internal write operation to an edge of the clock signal.

18. The memory device of claim 16, wherein the first circuit further provides column select signals to the memory cell array in synchronization with the clock signal.

19. The memory device of claim 18, wherein the first circuit latches the column select signals synchronously with an edge of the clock signal.

20. The memory device of claim 19, wherein the second circuit pulses a column address trap signal synchronously with an edge of the clock signal, and the first circuit latches the column select signals in response to a pulse of the column address trap signal.

21. The memory device of claim 16, wherein the first circuit performs the column redundancy check beginning on a first edge of a clock signal and provides the column select signals beginning on another edge of the clock signal.

22. A memory device comprising:
a memory cell array;
an addressing circuit; and
a control circuit to cause the addressing circuit to perform a column redundancy check during a delay to accommodate variations in the timing of a data strobe signal and begin providing column select signals to the memory cell array after performing the column redundancy check.

23. The memory device of claim 22, wherein the addressing circuit provides the column select signals by latching the column select signals synchronously with an edge of a clock signal.

24. The memory device of claim 23, wherein the addressing circuit latches the column select signals in response to a column address trap signal, and the control circuit asserts column address trap signal synchronously with the edge of the clock signal.

25. The memory device of claim 23, wherein the addressing circuit begins performing the column redundancy check on a first edge of the clock signal and begins providing a column select signals on another edge of the clock signal.

26. The memory device of claim 25, wherein said another edge comprises the next successive edge of the clock signal after the first edge.

27. The memory device of claim 22, wherein the control circuit asserts another signal to equalize data I/O lines coupled to the memory array for a first time interval that begins after the addressing circuit provides column select signals.

28. The memory device of claim 22, wherein the memory device comprises a double data rate (DDR) synchronous dynamic random access memory (SDRAM).

29. A computer system comprising:
a memory bus;
a memory controller coupled to the memory bus;
a central processing unit to cause the memory controller to furnish signals to the memory bus to cause a memory operation; and
a memory device coupled to the memory bus and adapted to:
establish a predetermined window of time to capture the data, and
perform a column redundancy check in response to the memory operation during the predetermined window of time.

30. The computer system of claim 29, wherein
the signals include signals that indicate a write command, and
the memory device is further adapted to capture said signals that indicate the write command in synchronization with a clock signal and begin an internal write operation to a memory cell array of the memory device in synchronization with the clock signal.

31. The computer system of claim 30, wherein the memory device begins performing the column redundancy check on a first edge of the clock signal and begins performing the internal write operation on another edge of the clock signal.

32. The computer system of claim 31, wherein said another edge comprises the next successive edge of the clock signal after the first edge.

33. The computer system of claim 30, wherein the memory device begins the internal write operation in response to a column address trap signal, and the memory device includes a control circuit to assert the column address trap signal synchronously with the edge of the clock signal.

34. The computer system of claim 33, wherein the control circuit asserts another signal to equalize data I/O lines of the memory device for a first time interval that begins after the memory device begins the internal write operation.

35. The computer system of claim 29, wherein the memory device comprises a double data rate (DDR) synchronous dynamic random access memory (SDRAM) device.

* * * * *